Oct. 25, 1949.  T. S. BRISKIN  2,486,255
POWER-DRIVEN TOOL
Filed April 19, 1945  5 Sheets-Sheet 1
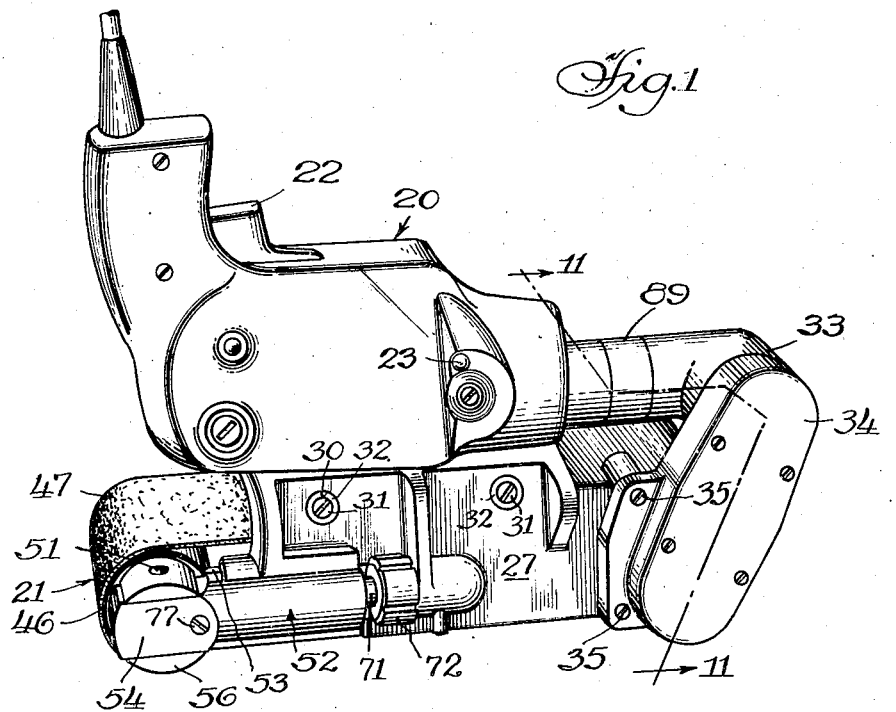
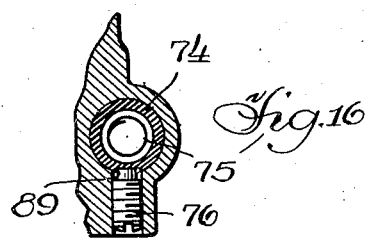
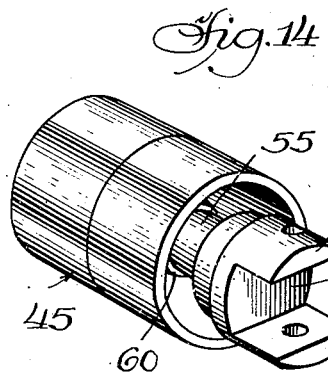
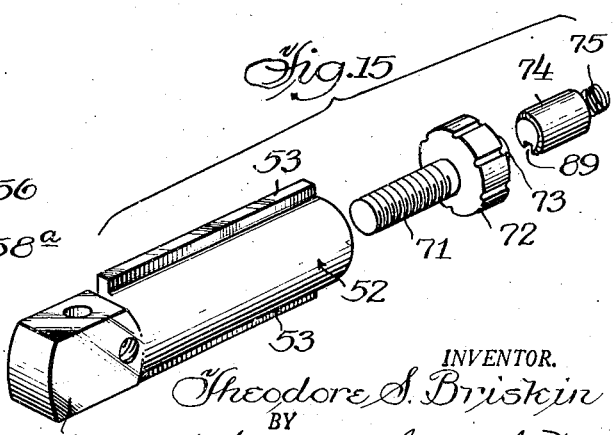
INVENTOR.
Theodore S. Briskin
BY
Zabel, Carlson, Gritzbaugh & Wells
Attys Oct. 25, 1949. T. S. BRISKIN 2,486,255
POWER-DRIVEN TOOL
Filed April 19, 1945 5 Sheets-Sheet 2
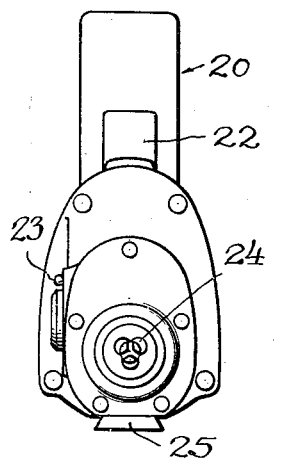
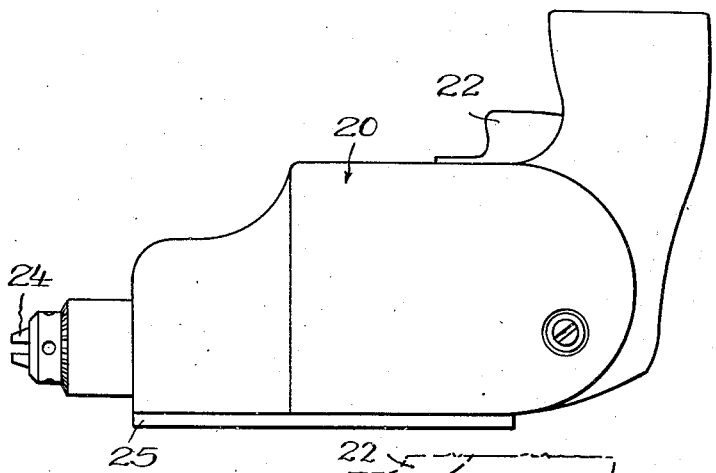
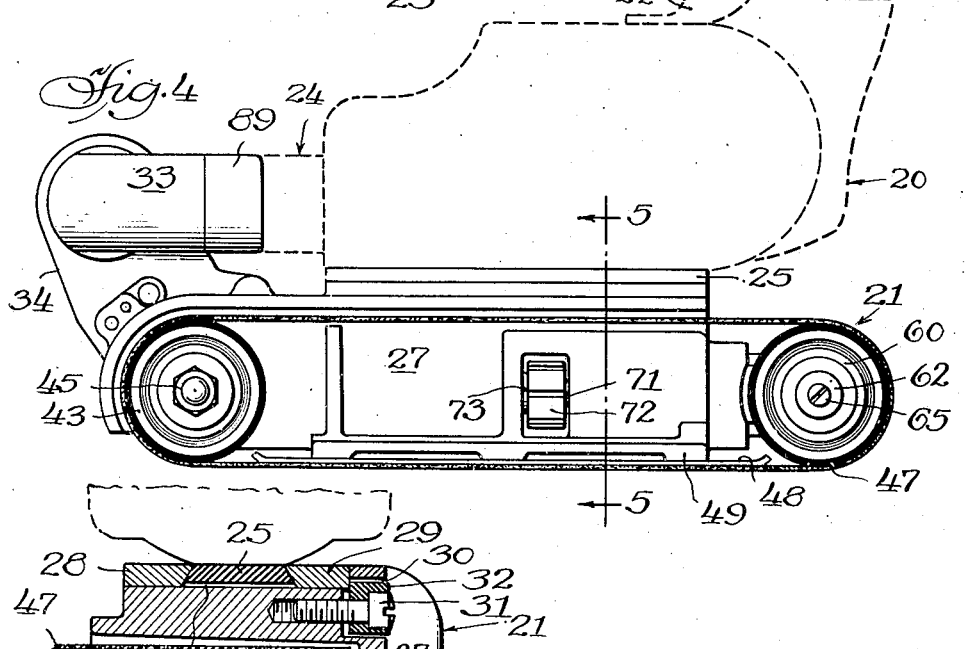
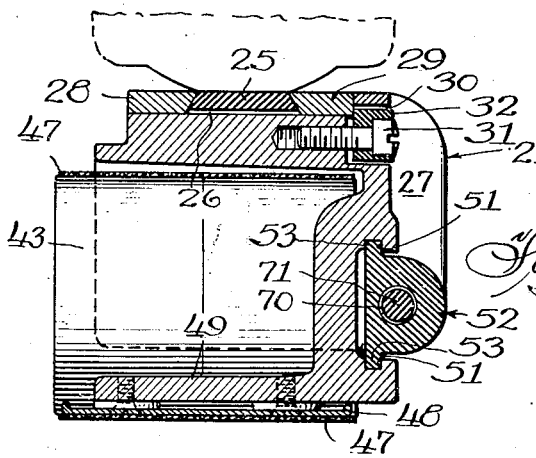
INVENTOR.
Theodore S. Briskin
BY
Zabel, Carlson, Gritzbaugh & Wells
Attys.

Oct. 25, 1949. T. S. BRISKIN 2,486,255
POWER-DRIVEN TOOL
Filed April 19, 1945 5 Sheets-Sheet 3
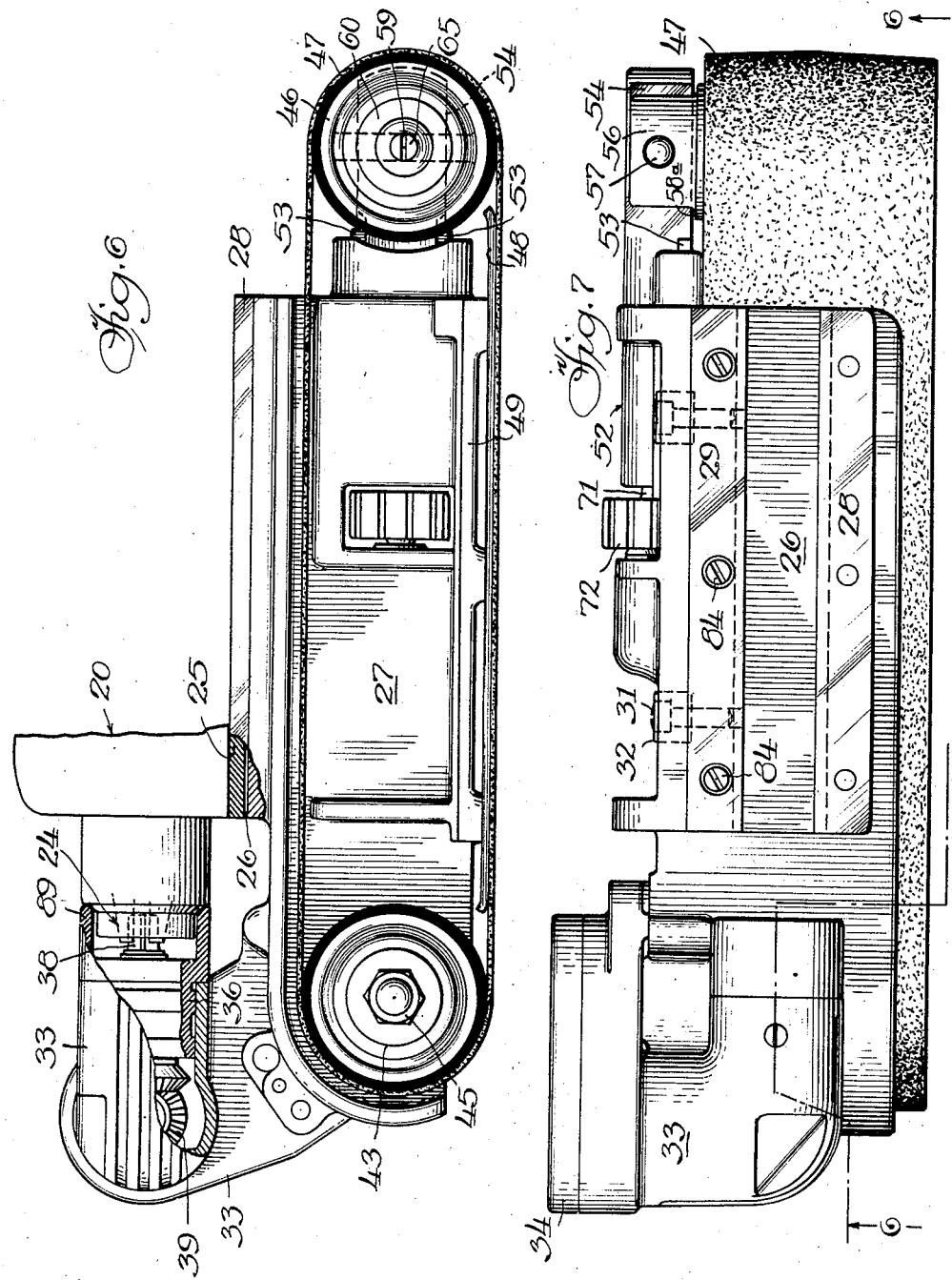
INVENTOR.
Theodore S. Briskin
BY
Zabel, Carlson, Gritzbaugh & Wells
Attys.

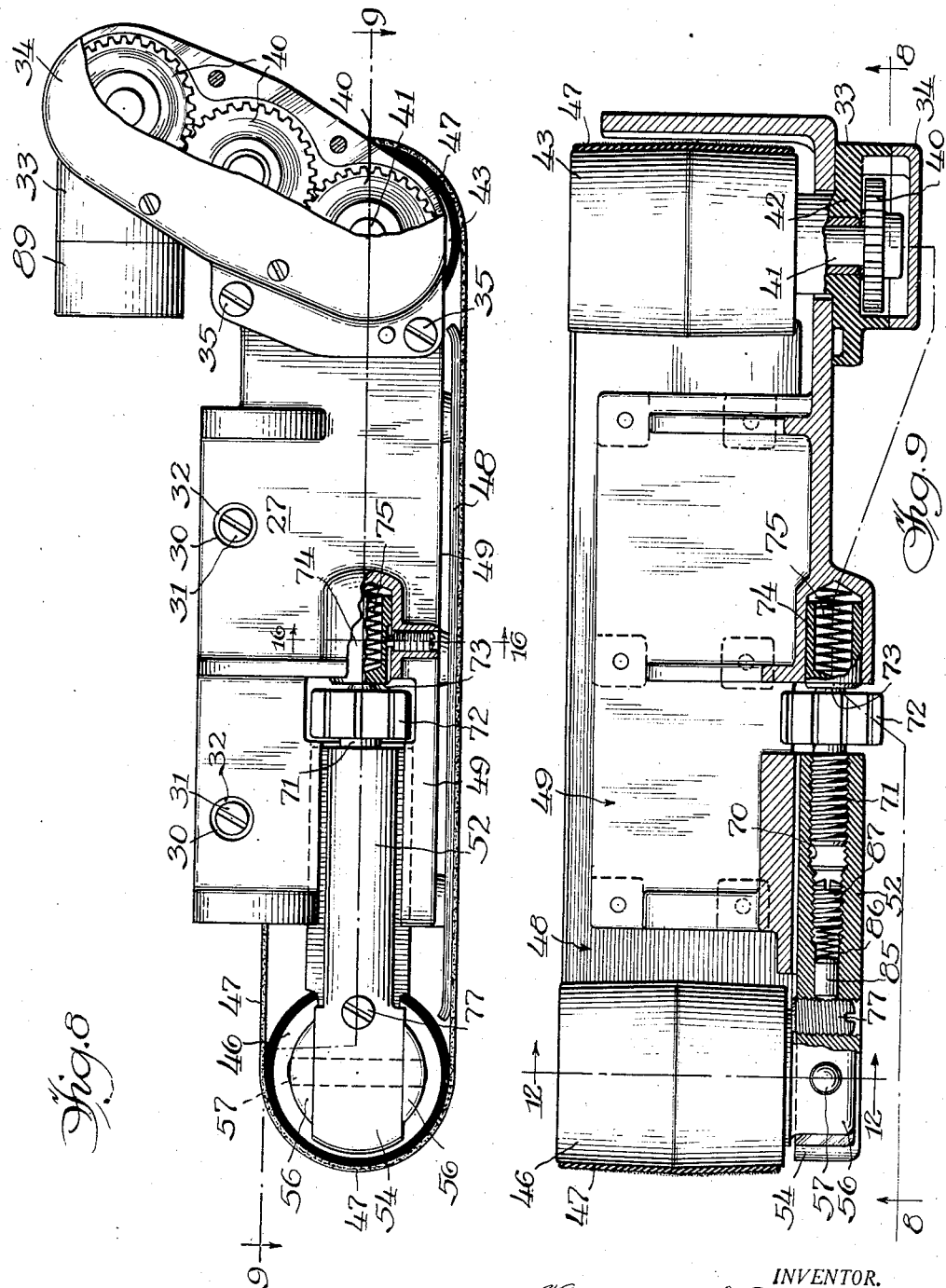

Oct. 25, 1949.   T. S. BRISKIN   2,486,255
POWER-DRIVEN TOOL
Filed April 19, 1945   5 Sheets-Sheet 5
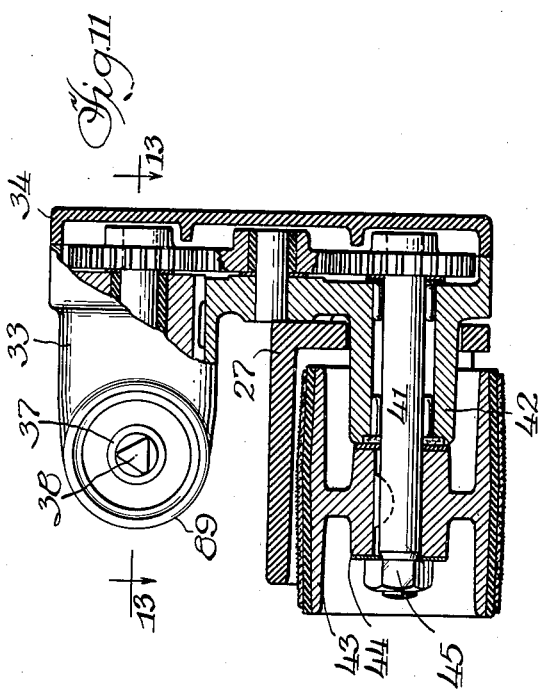
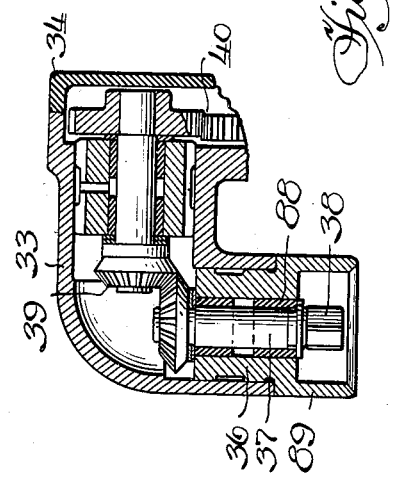
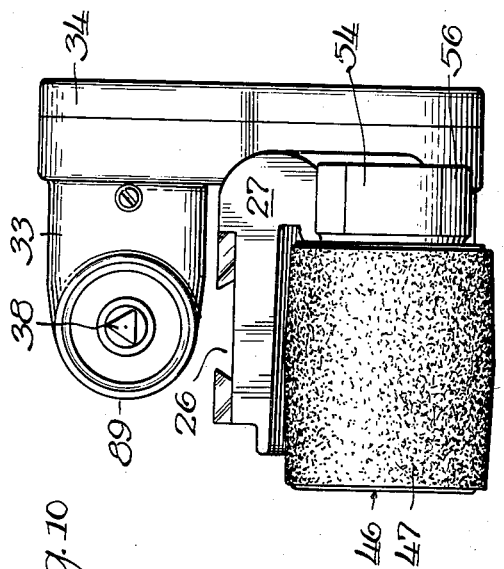
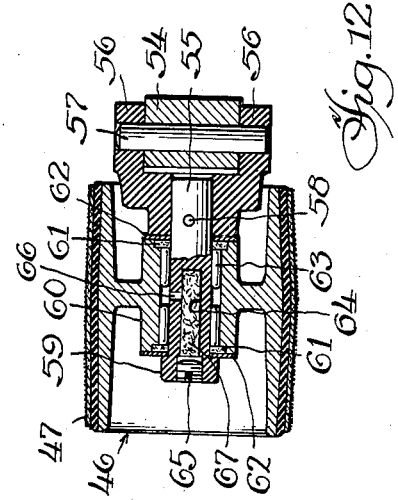
INVENTOR.
Theodore S. Briskin
BY
Zabel, Carlson, Gretzbaugh & Kelli
Attys Patented Oct. 25, 1949

2,486,255

UNITED STATES PATENT OFFICE 2,486,255

POWER-DRIVEN TOOL

Theodore S. Briskin, Chicago, Ill., assignor to Excel Auto Radiator Company, Chicago, Ill., a corporation of Delaware Application April 19, 1945, Serial No. 589,205

4 Claims. (Cl. 51—170)

This invention relates to a power driven tool, and in particular to a sander unit and a separate power unit removably associated therewith.

One of the principal objects of this invention is to provide a combination power unit and tool unit which are separable from each other, but which may be firmly associated with each other in a manner to permit a driving connection between the two. Preferably the power unit is in the form of a hand drill of the type shown in my copending application Serial No. 562,897, which drill is provided with the usual drill chuck. My invention contemplates the provision of a sliding connection between the drill and the tool unit such as a dove-tail, which permits a firm association of the two so as to permit them to be handled as a unit, and which also permits the chuck to be brought into driving engagement with the tang of the drive shaft of the tool.

A further object of my invention is to provide improved means of securing a power unit to a power driven tool, in combination with an improved coupling between the two.

Another object is to provide an improved sander, adapted to be powered by a separable power unit, which sander is of comparatively simple and light weight construction.

Still another object is to provide in a sander improved means for adjusting the tension of the sanding belt, and for aligning the pulleys.

A still further object is to provide an improved sanding unit which is adapted to be sold as an accessory for use with a power unit in the form of an ordinary electrical drill, and the frame of which sanding unit comprises two castings which may be bolted together, thereby insuring rigidity of the structure and permitting the use of comparatively simple drive means for the sander.

Other objects, features and advantages will become apparent as the description proceeds.

With reference now to the drawings, in which like reference numerals designate like parts:

Fig. 1 is a general view of a preferred embodiment of this invention;

Fig. 2 is an elevation of the power unit;

Fig. 3 is an end view thereof;

Fig. 4 is an elevation of the tool unit of the sander, the power unit being shown in dotted lines;

Fig. 5 is a section along line 5—5 of Fig. 4;

Fig. 6 is an enlarged elevation, partly in section, of the sander, taken along line 6—6 of Fig. 7;

Fig. 7 is a plan view of the sander;

Fig. 8 is an elevation of the reverse side of the sander taken along line 8—8 of Fig. 9;

Fig. 9 is a plan section taken along line 9—9 of Fig. 8;

Fig. 10 is an end view of the sander;

Fig. 11 is a section taken along line 11 of Fig. 1;

Fig. 12 is a section of the idler roller, taken along line 12—12 of Fig. 9;

Fig. 13 is a section taken along line 13—13 of Fig. 11;

Fig. 14 is a view of the idler pulley and fork assembly;

Fig. 15 is a view of the take-up slide for the idler pulley; and

Fig. 16 is a detailed section along line 16—16 of Fig. 8.

With reference now to Figs. 1 to 5, the reference numeral 20 designates generally the power unit, and the reference numeral 21 designates generally the removable tool. As pointed out heretofore the power unit is in the form of an electrically driven hand drill having the usual trigger switch 22 and a drill chuck 24. This particular drill is also provided with gear shift mechanism which includes a gear shift control 23 for changing the speed ratio of the power unit. The gear shift mechanism itself forms no part of this invention, but is described in the aforementioned copending application Serial No. 562,897. The tool 21, which is herein shown as a sander, and the drill are associated by a dove-tail connection which includes a dove-tail tenon 25 secured to the housing of the drill 20. The dove-tail tenon fits in a dove-tail groove 26 formed as a part of the sander, as shown in Fig. 5. The frame 27 of the sander is in the shape of an L-shaped casting, preferably of a light metal such as aluminum or magnesium. The horizontal portion of the frame constitutes an overhanging plate member, the surface of which is disposed below or recessed with respect to the upper edge of the vertical portion of the frame 27. To said recessed surface is riveted an under cut strip 28, which cooperates with an oppositely placed adjustable under cut strip 29, to form the dovetailed groove 26, as shown in Fig. 5. Screws 84, as shown in Fig. 7, limit the movement of the adjustable undercut strip 29 away from the frame 27, although it permits a certain amount of lateral movement. The vertical portion of the frame 27 which is adjacent the adjustable strip 29 is provided with bores 30 which intersect said recessed surface, as shown in Figs. 5 and 8. Screws 31 extend through said bores into a frame member 27, and are provided with plugs 32 which engage the side edge of adjustable strip 29. Thus when the screws 31 are tightened up, the groove 26 is narrowed, causing a gripping of the dovetail tenon 25.

The arrangement above described provides a convenient method of securely associating the drill 20 with the sander 21. The tenon 25 is slid into the groove 26, and then the screws 31 are tightened to form what is for all practical purposes an integral unit. Means are provided as the drill 20 is slid from the right to the left, as shown in Fig. 4, to engage a tang 38 formed at the end of the drive shaft 37, the drive shaft being associated with the sander 21. This engagement is shown in Fig. 6, and comprises a convenient means for coupling the power unit to the driven parts of the sander. It is contemplated that the chuck 24 be not screwed up tightly; a loose engagement is preferable to compensate for any slight misalignment of the parts.

The drive shaft 37 is suitably journaled in a bearing containing unit 36 having bearings 88, and with which is integrally formed a projecting guard 89 which projects a portion of the chuck 24. The bearing containing unit 36 is mounted in a gear housing 33, the shape of the gear housing being best shown in Figs. 8, 11 and 13. The gear housing is in the form of a casting which is bolted to the frame member 27 by means of screws 35. A cover plate 34 is provided for the gear housing. In addition to the drive shaft 37 and the bearing member 36, there are enclosed within the gear housing beveled gears 39 and a gear train 40, which serve to drive a shaft 41, as shown in Fig. 11.

The shaft 41 is mounted in a bearing sleeve 42 which forms an integral portion of the gear housing 33. A drive pulley 43 is mounted on the shaft 41 by means of a hub 44 which is keyed to the shaft, as shown in Fig. 11. A suitable nut 45 is provided to maintain the drive pulley in position on the shaft.

At the other end of the frame 27 is provided an idler pulley 46, and between the two pulleys extends a sanding belt 47. It will be seen that after the sander is slipped on to the drill 20, the belt 47 is driven by the drive pulley 43. A backing plate 48 is disposed immediately above the lower span of the belt 47 so as to provide substantial contact with the work throughout the length of the lower span. The backing plate 48 is suitably secured to a base plate 49 which extends laterally from the frame 27 and is integrally formed therewith, as shown in Figs. 5 and 9.

Means are provided for adjustably maintaining the idler pulley 46 under a spring tension. Such means includes a take-up slide 52 which is shown in Fig. 15 and which is provided with flanges 53. These flanges fit in recesses 51 in the frame member 27, as shown in Fig. 5. The end 54 of the take-up slide 52 is provided with parallel faces which are embraced by a fork 56, the fork forming a portion of the idler pulley and fork assembly shown in Figs. 12 and 14. A pin 57 couples the take-up slide 52 with the fork 56, the arrangement being such that the angular disposition of the pulley may be adjusted with respect to the slide.

The shank of the fork 56 is provided with a bore which is adapted to receive a shaft 55, the two members being rigidly secured to each other by a suitable pin 58, as shown in Fig. 12. The outer end of the shaft 55 is enlarged as indicated by reference numeral 59. Idler pulley 46 is provided with a hub 60, the inner diameter of which is greater than the outer diameter of the enlarged end 59, thereby permitting the hub to be slipped over the end of the shaft. The parts are maintained in the position shown by means of washers 62. Roller bearings 63 are provided between the shaft 55 and the inner bore of the hub 60. The shaft 55 is also provided with a bore 64 to provide a chamber for lubrication, the bore being closed by a plug 65. A passageway 66 connects the lubricating chamber with the roller bearing raceway. A lubricating wick 67 is disposed within the bore 64. Felt washers 61, disposed adjacent washers 62, also serve to supply lubrication.

It will be observed therefore that the idler pulley 46 is securely mounted with respect to the fork 56, and the idler pulley and fork assembly is adjustably mounted with respect to the take-up slide 52. The take-up slide 52 is provided with a bore 70, as shown in Fig. 9, the bore being threaded to accommodate an adjusting screw 71. The adjusting screw includes a thumb wheel 72 having a boss 73 which bears against a cup shaped plunger 74. A fairly heavy spring 75 is confined within the cup shaped plunger and reacts against the frame 27. At the opposite end of the take-up slide is provided a set screw 77 which bears against the surface 58ª of the fork 56.

By tightening up the set screw 77, the angular disposition of the axis of the shaft 55 can be regulated with respect to the frame 27. Thus idler pulley 46 may be properly aligned with respect to the drive pulley 43. Operation of the thumb wheel 72 will cause the sanding belt 47 to be tensioned. After all slack in the belt and take-up slide have been taken up, boss 73 on the thumb wheel 72 reacts against the comparatively heavy spring 75, and thus the belt is maintained under a resilient tension.

An adjustment is provided in the left end of the bore 70, as shown in Fig. 9, which prevents loosening of the set screw 77. This adjustment comprises a sliding pin 85 mounted in the left end of bore 70, and which is pressed against the side surface of the set screw 77 by means of a spring 86, the spring being confined by a threaded stud 87 disposed in the bore 70. By tightening up the stud, a constant pressure will be exerted against the set screw 77 which prevents the loosening thereof.

When the take-up slide 52 is removed from the frame, as for adjustment of the stud 87, a dog point screw 76, received within the frame 27, engages the cup shaped plunger 74 in a groove 89, thereby preventing the plunger from being forced out of its recess in the frame member by the comparatively heavy spring 75. This arrangement of the parts is shown in Fig. 16.

The operation of the device has been described in detail in connection with the description of the separate parts. The connection between the drill housing and the frame 27 of the sander is a sliding connection which permits the chuck 24 to be brought into operative engagement with the tang 38, the tang being of triangular cross section, as shown in Figs. 10 and 11. Before bringing the parts together, the chuck 24 is first adjusted so that it will easily receive the tang, a somewhat loose connection being preferred in order to compensate for any slight misalignment of the rotating parts. The screws 31 are then tightened up, thereby providing a firm grip all along the dove-tail 25, this grip being sufficiently tight as to prevent any relative motion between the drill and the sander in operation of the tool.

All of the gearing is journaled with respect to a common member, namely the gear housing 33, and the drive pulley 43 is also journaled therein. This arrangement facilitates assembly of the sander, and eliminates any danger of damage to the driving means through misalignment of the parts. The remaining portion of the sander is built around a single member, the frame member 27, to which the gear housing may be bolted. Thus, an extremely rugged construction is provided. After the power unit and the sander have been assembled, the sanding belt is put under the proper spring tension by manipulation of the thumb wheel 72. If, in the operation of the device, the belt tends to run off of the crowned pulleys 43 and 46, the parallelism of the pulleys may be adjusted by means of set screw 77. Although the hub 44 of the drive pulley 43 is closer to one end of the pulley than it is to the other, the pulleys are interchangeable, merely by reversing the pulley end to end, this being a feature which reduces manufacturing costs.

It will be observed that due to the firm connection between the power unit and the sander, the handle of the drill may be the part of the combination tool which is grasped by the hand of the operator. The two-speed feature of the drill renders the power unit particularly adaptable to use in connection with a sander.

Although only a preferred embodiment of this invention has been shown and described herein, it will be understood that various modifications and changes may be made therein without departing from the spirit of the invention as defined in the appended claims.

I claim:

1. A power driven tool comprising a separable power unit of the hand drill type provided with a housing having a handle projecting therefrom for manipulation of said tool and a chuck, in combination with a tool unit, said power unit having a dove-tail tongue extending from the surface of said housing and disposed substantially parallel to the axis of said chuck, said tool unit comprising a frame including an overhanging plate member having a recessed surface adjacent the housing of said drill, a pair of under-cut strips disposed on said recessed surface and spaced from each other to form a dove-tail groove for cooperation with said dove-tail tongue, one of said strips being secured to said recessed surface, screw means to secure slidably the other of said strips to said recessed surface in a manner to permit of a limited amount of movement toward and away from said first mentioned strip, a tapped bore in said frame having an enlarged portion intersecting said recessed surface, a plug fitting in said enlarged portion of said bore and engaging said second mentioned strip, a screw extending through said plug and engaging said tapped bore for urging said plug into engagement with said slidable strip for gripping said dove-tail tongue, a driven shaft for said tool unit disposed in axial alignment with said chuck when said dove-tail tongue is received in said dove-tail groove and terminating in a tang whereby the driven shaft may be slid into driven engagement with said chuck and said parts locked in operative position.

2. In a power driven tool having spaced idler and drive pulleys on which a sanding belt or the like may be mounted, a frame, means for mounting said drive pulley in fixed relationship with respect to said frame, sliding means mounted in said frame for sliding movement along an axis which intersects the axis of said fixed pulley, said idler pulley being rotatably journaled with respect to said sliding means and on an axis substantially parallel to the axis of said fixed pulley, means to adjust the angular disposition between the axis of said idler pulley and the sliding axis of said sliding member in order to bring said pulleys into parallelism, said sliding means including a take-up slide and an adjusting screw threaded into one end of said slide for regulating the effective length of said sliding means, resilient means interposed between said adjusting screw and said frame member in order to introduce a preload on the assembly comprising said sliding means and said idler pulley when a sanding belt or the like is tensioned between the two pulleys, and means limiting the expansion of said resilient means to permit free sliding movement of said sliding means when the effective length thereof is diminished.

3. In a power driven tool having two spaced pulleys on which a sanding belt or the like may be mounted, a frame, means for mounting one of said pulleys in a fixed axial relationship with respect to said frame, sliding means mounted in said frame and a take-up slide provided with opposite plane parallel surfaces and an adjusting screw threaded into one end of said slide for regulating the effective length of said sliding means, an idler pulley assembly carrying an idler pulley and provided with a fork for embracing said plane parallel surfaces, a hinge pin passing through said fork and said slide whereby said idler pulley assembly is hingedly mounted on said slide, said fork including a connecting portion having a surface which is substantially perpendicular to said plane parallel surfaces, a tapped bore passing through said slide and disposed substantially parallel to said plane parallel surfaces, a set screw disposed in said tapped bore and bearing against said perpendicular surface for adjusting the angular position of said idler pulley assembly with respect to said slide, said slide being provided with an axial bore which intersects said tapped bore in which said set screw is disposed, spring biased means disposed in said bore and engaging said set screw to prevent loosening thereof, a spring interposed between said adjusting screw and said frame, and means limiting the expansion of said spring to permit free sliding movement of said sliding means when the effective length thereof is diminished.

4. In a power driven tool having spaced drive and idler pulleys in which a sanding belt or the like may be mounted, a frame, means for mounting one of said pulleys in a fixed relationship with respect to said frame, sliding means removably mounted in said frame for sliding movement in a direction perpendicular to the axis of said fixed pulley, said idler pulley being rotatably journaled with respect to said sliding means and on an axis substantially parallel to the axis of said fixed pulley, said sliding means including a take-up slide having a longitudinal tapped bore therein and an adjusting screw threaded into said bore and including a thumb wheel for rotating the same to regulate the effective length of said sliding means, a spring biased plunger slidably mounted in said frame and bearing against said adjusting screw in order to introduce a pre-load on said sliding means, and means including a dog point screw threaded into said frame and engaging said spring biased plunger to limit the action of said spring-biased plunger to permit free sliding movement of said sliding means when the effective length thereof is diminished and to prevent ejection of said plunger from said frame when said slide and said adjusting screw are removed from said frame.

THEODORE S. BRISKIN.

REFERENCES CITED

The following references are of record in the file of this patent:

UNITED STATES PATENTS

| Number | Name | Date |
|---|---|---|
| 712,537 | Hisey | Nov. 4, 1902 |
| 1,417,228 | Blocker | May 23, 1922 |
| 1,438,447 | Luman | Dec. 12, 1922 |
| 1,441,242 | Robinson | Jan. 9, 1923 |
| 1,449,463 | Hamersveld et al. | Mar. 27, 1923 |
| 1,826,177 | Johnson | Oct. 6, 1931 |
| 1,969,318 | Myers | Aug. 7, 1934 |
| 1,974,806 | Curtis et al. | Sept. 25, 1934 |
| 2,260,949 | Mall | Oct. 28, 1941 |
| 2,272,273 | Parker | Feb. 10, 1942 |
| 2,301,853 | Cannon | Nov. 10, 1942 |